Patented Apr. 1, 1924.

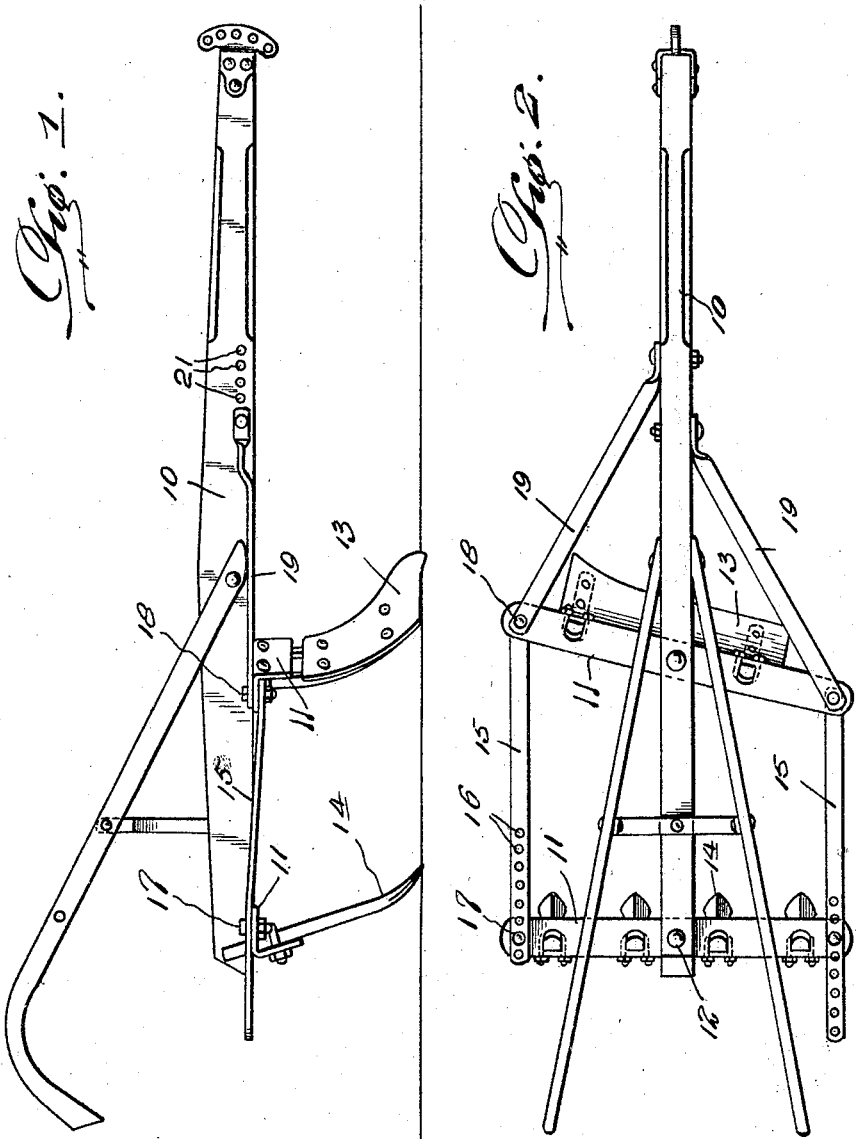

1,489,196

UNITED STATES PATENT OFFICE.

GEORGE T. CURREY, OF MURFREESBORO, TENNESSEE.

HARROW.

Application filed August 11, 1922. Serial No. 581,185.

*To all whom it may concern:*

Be it known that I, GEORGE T. CURREY, a citizen of the United States, residing at Murfreesboro, in the county of Rutherford and State of Tennessee, have invented new and useful Improvements in Harrows, of which the following is a specification.

This invention relates to agricultural implements and has for an object the provision of an implement which combines both a scraper and cultivator, so that both scraping and cultivating may be simultaneously performed, or the implement adjusted either for scraping or cultivating.

Another object of the invention is the provision of means whereby the scraper blade or the cultivator teeth or both, may be adjusted at different angles transveresly to the line of travel of the implement.

With the above and other objects in view, the invention further includes the following novel features and details of construction, to be hereinafter more fully described, illustrated in the accompanying drawings and pointed out in the appended claims.

In the drawing:—

Figure 1 is a side elevation of the invention.

Figure 2 is a top plan view of the same.

Referring in detail to the drawings, wherein like characters of reference denote corresponding parts, the implement is shown as including a beam 10 which carries an adjustable frame. This frame includes end bars 11 which extend transversely of and are pivotally secured to the beam 10 as shown at 12, whereby the said bars may be pivotally moved. One of the bars, for example the front bar 11, has secured thereto a scraper blade 13, while the other bar 11 has secured thereto a plurality of harrow or cultivator teeth 14 which follow the blade 13 and will act to stir up or cultivate the soil after the scraper blade has cut away and removed the weeds or grass.

The blade 13 and the teeth 14 are capable of horizontal adjustment which is effected by pivotally moving the bars 11 and in order to hold these bars in the desired adjusted position, their outer ends are connected by rods 15. One end of these rods is provided with spaced openings 16 for the passage of bolts or similar fastening devices 17, the latter being utilized as means for adjustably securing this end of the rods 15 to the opposite ends of the rear bar 11. The front bar 11 has its opposite ends pivotally connected to the ends of the rods 15 as shown at 18 and this connecting means also serves as a means for connecting the inner ends of adjusting rods 19. These last mentioned rods which serve to prevent accidental pivotal movement of the bars 11 have their forward ends adjustably connected to the opposite sides of the beam 10, the latter being provided with spaced openings 21 for this purpose.

The invention is susceptible of various changes in its form, proportions and minor details of construction and the right is herein reserved to make such changes as properly fall within the scope of the appended claims.

Having described the invention what is claimed is:—

1. A combined scraper and cultivator comprising a beam, a frame pivotally secured to the beam, a scraper carried by the frame, cultivator teeth also carried by the frame and adjustable means connecting the frame and beam, whereby the frame may be pivotally adjusted.

2. A combined scraper and cultivator comprising a beam, spaced transversely arranged bars pivotally secured to the beam and extending upon opposite sides thereof, a blade secured to one of the bars, cultivator teeth secured to the other bar, rods adjustably connecting the ends of the bars, whereby said bars may be relatively adjusted and means adjustably connecting the ends of one of the bars to the beam, to hold the bars in adjusted position.

3. A combined scraper and cultivator comprising a beam, a frame pivotally secured to the beam, a scraper carried by the frame, cultivator teeth also carried by the frame and means included in the frame whereby the scraper and cultivator teeth may be pivotally and relatively adjusted.

In testimony whereof I affix my signature.

GEORGE T. CURREY.